Oct. 7, 1941.  R. HASTINGS, JR  2,258,180
PORTABLE STACKER FOR PALLET SKIDS AND THE LIKE
Filed June 27, 1940  3 Sheets-Sheet 1

Inventor
Russell Hastings Jr.
by Heard Smith & Tennant.
Attys

Oct. 7, 1941.   R. HASTINGS, JR   2,258,180
PORTABLE STACKER FOR PALLET SKIDS AND THE LIKE
Filed June 27, 1940   3 Sheets-Sheet 2

Inventor.
Russell Hastings Jr.
Heard Smith & Tennant.
Attys

Patented Oct. 7, 1941

2,258,180

UNITED STATES PATENT OFFICE 2,258,180

PORTABLE STACKER FOR PALLET SKIDS AND THE LIKE

Russell Hastings, Jr., Wellesley Hills, Mass., assignor to Lewis-Shepard Company, Watertown, Mass., a corporation of Massachusetts Application June 27, 1940, Serial No. 342,669

19 Claims. (Cl. 214—113)

This invention relates to portable trucks for transporting articles and the general object of the invention is to provide a portable truck having front wheels pivotally movable about a vertical axis to permit the steering of the truck, load supporting means, and rear wheels relatively movable longitudinally of the load supporting means to a loading position beneath and adjacent the front end of the load supporting means and to a load transporting position, preferably substantially midway of the length of the load supporting means, with means for releasably locking the wheels against such relative longitudinal movement while in load transporting position, and preferably provided with means for preventing or restricting rotation of the rear wheels during the relative longitudinal movement between the wheels and load supporting means.

More particularly the invention relates to improvements in portable hoisting machines or stackers and the object of the invention is to provide a portable truck having a base which may be introduced beneath a pallet or skid, or other means for supporting a load at a distance from the floor and having vertically movable load supporting means adapted to be introduced into a pallet, or beneath a skid, whether unloaded or loaded, thus supported at a distance above the floor, or one of a series of superimposed loaded or unloaded pallets or skids, and the load supporting means then raised to remove the pallet or skid from its support and enable it to be transported to a suitable destination and deposited upon a similar base support or superimposed upon other previously deposited loaded or unloaded pallets or skids. It will, however, be understood that the invention herein may be employed as a usual elevating truck for transporting loads in any desired manner.

One of the objects of the invention is to provide a hoisting machine or stacker of the character described having a vertically narrow base adapted to be introduced into a pallet or beneath a skid, with vertically movable load supporting means having a rearwardly extending load receiving member or members adapted to be introduced into the pallet or beneath the skid to be transported, with rear wheel mechanism so mounted as to permit relative longitudinal movement between the base member and rear supporting wheel thereby to permit the base member and the load receiving members to be thus positioned beneath the support for the load to be transported. In other words, the invention comprises a portable hoisting machine having rear wheels so mounted as to permit relative movement between the base and wheels, thereby permitting the shortening of the wheel base sufficiently to enable the load receiving members to be inserted beneath the load supporting surface of the pallet or skid and when the load supporting means is raised to enable such relative movement between the base and the rear supporting wheels as to position the rear wheels properly beneath the load which is carried by the load supporting means.

Another object of the invention is to provide a device of the character described with means normally locking the rear wheel mechanism to the base at a predetermined proper distance from the front end of the base for transportation of the load, with means for releasing said locking means to permit a shortening of the wheel base when the hoisting mechanism is to be loaded or unloaded.

A further object of the invention is to provide means for restricting or preventing rotation of the rear wheels during the relative movement between the base and wheels when the hoisting machine is withdrawn from loading position or when moved from normal transporting position to loading or unloading position.

A further object of the invention is to provide controlling means including a manually operable lever and mechanism operable when the lever is moved to one position to unlock the rear wheel mechanism from transporting position and maintain it in unlocked position, and when moved to another position to pre-set the locking mechanism so that the wheel mechanism will be automatically relocked when the wheel mechanism is moved relatively to the base to transporting position. This mechanism preferably includes means for locking the wheels against rotation during relative movement between the wheel mechanism and the base and automatically releasing the wheels for rotation upon locking of the wheel mechanism to the base in transporting position.

The invention is particularly adapted for transporting pallets or skids, whether loaded or unloaded, from a stack and restacking the same at the destination, such for example as for transporting superimposed pallets or skids, either loaded or unloaded, from a warehouse to a railway car and again stacking them in the car without the necessity of other manual manipulation, thereby economizing in effort and waste of time which otherwise would be required.

These and other objects and features of the invention will more fully appear from the following description and the accompanying drawings and will be particularly pointed out in the claims.

The hoisting machine embodying the invention as illustrated herein comprises generally a base having a rigid upright and suitable steering mechanism at its front end, load supporting means mounted on said uprights and having a rearwardly extending load supporting member or members adapted to enter the pallet or beneath the skid to be hoisted, means for raising and lowering the load supporting means, and rear wheels mounted upon said base for longitudinal movement relatively thereto to permit the base to be inserted beneath a pallet which is supported at a suitable distance from the floor and to enable the load supporting members to be introduced into the pallet or beneath the platform of the skid which supports the load.

Figure 5:
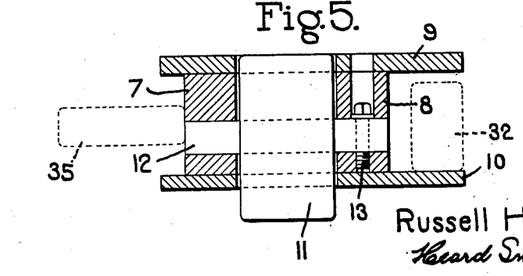
Fig. 5 is an enlarged detail sectional view on line 5—5 of Fig. 3.

In the preferred construction illustrated the truck of the hoisting machine is in the form of a frame comprising separated parallel base members 1 and 2 of narrow vertical width rigidly united at their front ends only by a preferably fabricated head construction 3 having suitable wheel supporting means to permit steering of the truck, an upright in the form of vertically braced channel-shaped standards 4 rigidly mounted upon the front end portion of the base members, a carriage 5 having rear wheels 6 for supporting the truck movable relatively longitudinally of the truck to a position adjacent to the standard, or to a position remote therefrom beneath the weight of the load. In the preferred construction illustrated each of the base members comprises parallel longitudinally extending girders 7 and 8 having a top plate 9 and a bottom plate 10 secured thereto, the rear portions of the plates 9 and 10 being longitudinally recessed and a series of rollers 11 rotatably mounted upon axles 12 which are secured in suitable journals in the girders 7 and 8 and secured against rotation in any suitable manner as by machine bolts 13 mounted in countersinks in the girder 8 and extending through the axle into screw threaded engagement with the portion of the girder therebeneath, as shown in Fig. 5.

Figure 3:
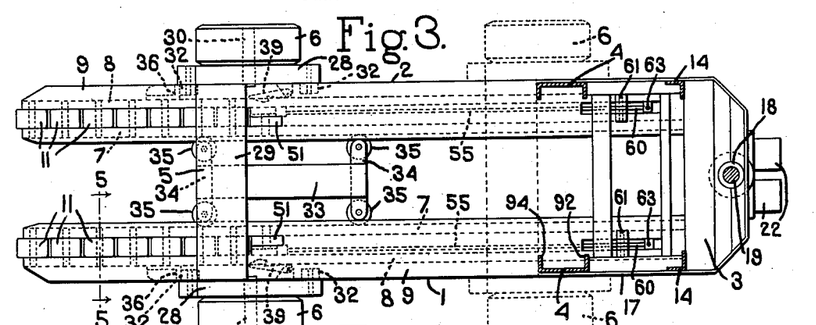
Fig. 3 is a plan view of the base of the truck, the upright standard at the front end of the truck and the front steering post being shown in section, and the load supporting means omitted.

The vertical standards 4 are of channel shape with the flanges thereof extending inwardly to provide a guideway for the load supporting means, as will hereinafter be described. The standards 4 are rigidly secured by welding to the base and vertical bracing standards 14 which are likewise welded to the base extend upwardly therefrom, preferably in parallelism to the standards 4, a suitable distance and are connected to said standards by plates or angle bars 15, the upper ends 16 of the standards being preferably inclined from the upper connecting plates 15 to the upper ends of the standards 4 to which they are welded. A wide plate 17, which is welded to the standards 4 and 14, extends forwardly and around the head 3, as shown in Fig. 3, and is also welded to a fabricated head 3 formed of suitable plates and angle bars. The head is provided with a vertical sleeve 18 forming a journal for a steering post 19 preferably having a forked lower end 20 in which the axle 21 of preferably a pair of steering wheels 22 having cushioning tires is journaled. The steering post 19 has secured to its upper end a forwardly inclined bracket 23 upon which a steering tongue 24 is pivotally mounted for vertical swinging movement. Obviously other mechanism may be employed which will enable the truck to be steered, such as casters or a different type of steering mechanism.

Figures 1, 2:
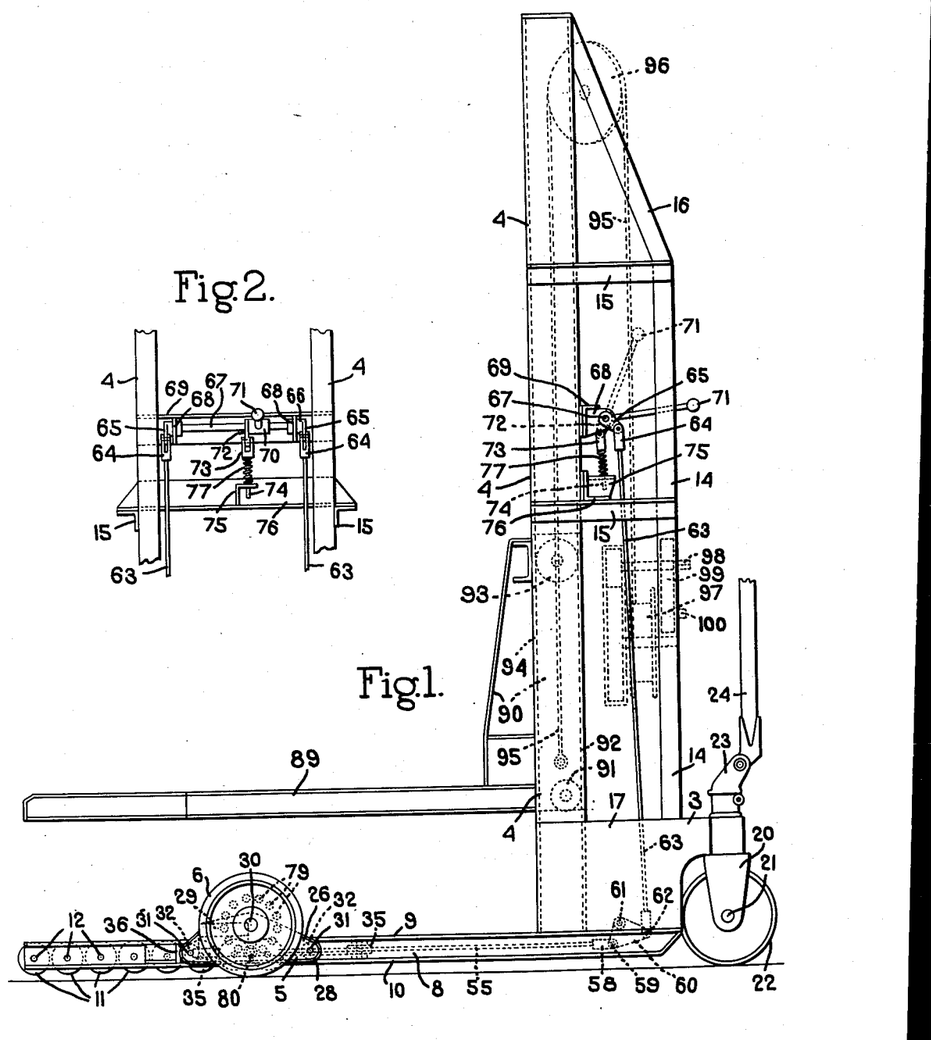
Fig. 1 is a side elevation of an elevating truck or hoisting machine embodying the invention, the mechanism for raising and lowering the load supporting means being diagrammatically shown in dotted lines.
Fig. 2 is a detail front view of a portion of the manually operable means for controlling the relative movement of the rear wheels of the truck longitudinally of the base thereof, and also for controlling the rotation of the rear wheels.

Any suitable mechanism may be employed for enabling the rear wheel supporting mechanism to have longitudinal relative movement with respect to the load supporting means to enable it to be positioned for transportation beneath the major portion of the weight of the load. In the particular construction shown in the drawings the rear wheel mechanism comprises a carriage having side frames formed of parallel plates 26 and 27, preferably somewhat of triangular form, as illustrated in Fig. 1, and connected to suitable end and top plates 28 which are welded to the ends of the plate 26 to form a rigid box-like structure.

The side frames are rigidly connected together by a bridge, preferably in the form of a heavy steel plate 29, which is welded or otherwise fixedly secured to the side frames. Wheel shafts 30 are mounted in axial alinement in suitable apertures in the side plates 26 and 27 of the side frames and extend therethrough and the wheels 6 are mounted upon antifriction bearings upon the wheel shafts. The wheels 6 desirably are provided with resilient preferably rubber tires.

Short shafts 31, which extend inwardly through the side plates 26 and 27 of the side frames and are welded thereto, are provided at their ends with rollers 32, which desirably are mounted on antifriction bearings, and are located between the upper and lower plates 9 and 10 of the rearwardly extending base members and normally engage the under faces of the upper plates 9 which desirably are somewhat thicker than the lower plates 10. These rollers therefore provide antifriction means which permit relative movement between the base members and the carriage without substantial resistance thereto.

In order to prevent skewing of the carriage during the relative movement thereof longitudinally of the base, antifriction means are provided to engage the inner girders 7 of the base members. In the construction shown such means comprises a plate or frame 33 which is rigidly secured to the bridge plate 29 and is provided at its opposite ends with laterally extending rigid arms 34 the ends of which are provided with rollers 35 which engage the inner walls of the girders 7. By reason of this construction the carriage will move easily longitudinally of the side frames without binding.

Any suitable means may be provided for locking the carriage to the base members in such position as to lie properly beneath the major portion of the weight of the loaded members by the load supporting means. In the particular construction illustrated stop members, such as angle plates 36, are secured to the webs of the base members in position to engage the rear rollers 32 and the carriage is provided with suitable latches adapted to engage shoulders upon the base when the rollers 32 have engaged the stops 36.

As illustrated herein the girders 8 are provided with recesses 37 having at their forward ends concavedly curved walls 38 presenting shoulders adapted to be engaged by the hook-shaped ends of latches 39 which are pivotally mounted upon brackets 40 welded or otherwise secured to the side plates 27 of the carriage side frames.

Means are provided tending to force the latches into locking engagement with the shoulders 38. As illustrated rods 41, which are pivotally connected to the latches, extend through alined apertures in the plates 26 and 27 of the side frame and have mounted upon them spiral compression springs 42 which abut at one end against a shouldered member 43 upon the rods and at the opposite end upon the plate 26.

The springs 42 therefore act continuously to force the latches toward the girders 8 of the side frames and to force the latches into locking position when they register with the recesses 37. In order to enable the latches to ride smoothly along the girders 8 as the carriage is moved relatively to the frame the latches are provided with rollers 44 the peripheries of which extend beyond the edges of the latches and are therefore provided with antifriction means for engaging the girders 8.

The recesses 37 are so formed in the girders 8 as to present preferably inclined walls 45 adapted to be engaged by the end portions of the latches 39 when in locking position and thereby to limit the swinging movement of the latches.

Any suitable means may be provided for releasing the latches from locking engagement with the girders 8 of the frame. The preferred form of releasing mechanism which is illustrated herein comprises latch-releasing levers 46 having mounted upon their front ends rollers 47 engaging the concavedly curved front walls 38 of the recesses 37. The levers 46 are slidably fulcrumed intermediate of their ends upon curved rear walls 48 of the recesses 37 and are provided at their rear ends with antifriction rollers 49 adapted to engage vertical walls of plates 50 which are suitably secured, as by welding, to the top and bottom plates 9 and 10 of the rearwardly extending base members. Desirably relatively narrow rollers 51, which further extend the series of rollers 11, are rotatably mounted upon shafts 52 which are fixedly secured to the vertical plates 50 and to the girders 7.

Figure 4:
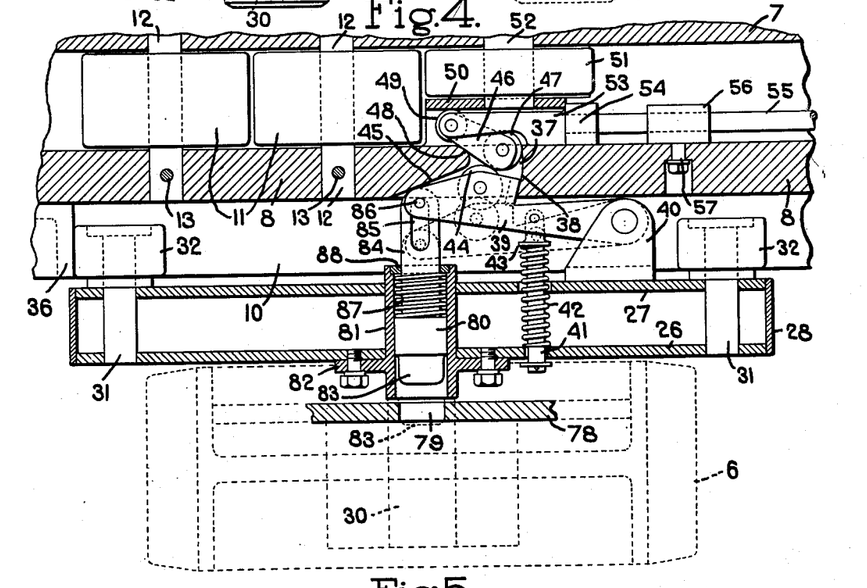
Fig. 4 is an enlarged detail view, mainly in longitudinal section, illustrating the means for locking the rear wheel carriage against relative longitudinal movement with respect to one of the rearwardly extending base members of the truck, the locking web for one of the rear wheels being shown in section and the wheel otherwise illustrated in dotted lines.

The means for actuating the latch-releasing levers 46 comprise cross heads 53 which are reciprocably mounted between the inner faces of the girders 8 and the faces of the plates 50 and are provided at their rear ends with forked extensions which engage the pivots of the rollers 49. The front ends of the cross heads 53 are enlarged to present shouldered members 54 adapted to engage the forward ends of the walls 50, thereby to limit the rearward movement of the cross head. The cross heads have secured to them or integrally formed upon them rods 55 which extend through bearings in guides 56 which are secured to the girders 8 by countersunk bolts 57, as illustrated in Fig. 4. The rods 55 extend longitudinally of the base members between the girders 7 and 8 thereof and are provided at their front ends with clevises 58 (see Fig. 1) which are pivotally connected to studs 59 upon preferably triangular bell crank levers 60 which are fulcrumed upon pivots 61 mounted in suitable brackets on and near the front end of the base member. The forward arms of the bell crank lever are connected by pivots 62 to clevises upon the lower ends of upwardly extending rods 63, the upper ends of which are provided with clevises 64 which are pivotally connected to arms 65 extending angularly downwardly from bosses 66 which are fixedly secured to a shaft 67 which is pivotally mounted in suitable brackets 68 which are mounted upon transverse preferably angle iron girders 69 which are welded to the front faces of the standards 4 of the upright. The rod 67 has secured to it intermediate of its length a cylindrical boss 70 of a handle member 71 and the boss 70 has a rigid downwardly extending arm 72 which is pivotally connected to a bifurcated upper end 73 of a rod 74, the lower end of which is slidably mounted in the horizontal arm of a bracket 75 which is secured to a plate or girder 76 which in turn rests upon one of the angle bars 15 which connect the main standards 4 to the reenforcing standards 14. The arm 72 is so positioned relatively to the arms 65, all of which are secured to the rod 67, that when the lever 71 is moved from upright position, as illustrated in dotted lines in Fig. 1, to horizontal position, the arm 72 will swing across the vertical plane of the axis of the rod 67. A spring 77, which is interposed between the bracket 75 and the clevis 73, acts in either position of the handle to retain the lever 71 in the position to which it is moved, that is to say, either in the upright position or horizontal position illustrated in Fig. 1. The handle member 71 desirably is provided with a ball-shaped end adapted to be conveniently grasped by and manually manipulated by the operator.

As illustrated in full lines in Fig. 1 and Fig. 4 the manually operable handle lever 71 is swung downwardly to horizontal position, thereby forcing the rods 63 downwardly so that the bell crank lever 60 is swung downwardly about its pivot and the pivot at the lower end of the rear arm moved rearwardly, thereby forcing the rods 55 and cross heads 53 rearwardly causing the latch-releasing levers 46 to be raised to the position illustrated in full lines in Fig. 4, and permitting the latches 39 to engage the shoulder upon the wall 38 of the recess 37, thus locking the carriage against longitudinal movement relatively to the base members.

When it is desired to release the lock the handle member 71 is swung upwardly to the position illustrated in dotted lines in Fig. 1, thereby raising the rods 63 and actuating the bell crank lever 60 so that the rear pivot 59 thereof will be drawn forwardly. This will move the rods 55 and cross head 53 forwardly and cause the roller 47 to ride outwardly upon the curved front wall of the recess 37. The rollers 47 of the lifting levers 46 first engage the rollers 44 upon the latches and later the latches 39 themselves thereby forcing the latches outwardly out of locking engagement with the shoulders of the front walls 38 of the recesses 37 until the latches are in position to permit the carriage to be moved longitudinally of the base members. By thus unlocking the carriage from the base members the base members can be moved rearwardly relatively to the rear wheels beneath the pallet or skid to be transported.

In order to insure such relative movement between the carriage and the base of the truck or hoisting machine, to permit the base to be inserted beneath the pallet to be transported, means are provided for restraining and preferably locking the wheels against rotation during relative movement of the base member and wheels in either direction. Any suitable means for accomplishing this purpose may be provided, but preferably such means are so constructed as automatically to lock the wheels against rotation upon release of the mechanism which locks the carriage to the base.

In the preferred construction illustrated the webs of the rear wheels 6 are preferably supplemented by webs 78 parallel with the webs of the wheels and inwardly thereof provided with a circular series of holes or sockets 79 (Fig. 1) suitably spaced apart an equal distance from the axes of the wheels adapted to be engaged by a locking bolt. In the preferred construction locking bolts 80 are slidably mounted in tubular sleeves 81 which extend through and are rigidly mounted in the side plates 26 and 27 of the respective side frames and are provided with flanges 82 which are bolted or otherwise secured to the side plate 26. The end of the bolt 80 is preferably provided with a reduced extension 83 adapted substantially to fit the sockets 79 in the web 78 of the wheel. The bolt 80 has an integral extension 84 of smaller diameter, or which may be flat, which is provided near its end with a longitudinal slot 85 the inner end of which is engaged by a pin 86 which is mounted in a preferably bifurcated end of the latch 39. A helical spring 87, which surrounds the extension 84 of the bolt 80 and is interposed between a shoulder on the bolt and a cap plate 88 fixedly secured within or to the end of the sleeve 81, tends normally to force the bolt outwardly into engagement with a socket in the web 78 of the rear wheel 6. The spring 87 is of considerably less strength than that of the spring 42 which tends to force the latch into locking position, but is of sufficient strength to force the bolt into locking position when the latch is moved to unlatching position, in which case the pin 86 is moved downwardly in the slot 85 so that the spring 87 is enabled to force the bolt outwardly into a socket of the web 78.

Inasmuch as the manually operable arm 71 of the latch-controlling mechanism is adapted to be locked either in horizontal or upright position it is obvious that when it is moved to upright position to release the latch the latch-releasing lever will be swung forwardly and the roller 47 forced outwardly to a position in which the latch cannot again engage the shoulder of the recess 37 until the manually operable arm 71 is swung down to horizontal position. Furthermore, during the relative movement of the carriage and base the latch will be held in the depressed position, illustrated in dotted lines in Fig. 4, and the bolt maintained in locked position so long as the manually operable arm is in upright position. As a consequence the wheels 6 will remain locked so long as relative movement between the carriage and base member is permitted.

By reason of the construction above described control of the relative movement between the carriage and the base members may be accomplished with a minimum effort upon the part of the operator as the swinging of the handle lever 71 to upward position operates to release the latch of the carriage from locking engagement with the shoulders 37 of the girder 8 and upon relative movement of the carriage and base member the latch is maintained out of locking position by engagement of the roller 44 with the outer face of the girder 8 and at the same time the bolt 80 is maintained in engagement with a socket 79 of the web 78 of the rear wheel by the action of the spring 87.

After the carriage has moved forwardly in proximity to the upright the handle lever 71 may be swung to normal horizontal position thereby swinging the latch-actuating lever 46 inwardly and presetting the mechanism, so that when the carriage is moved rearwardly relatively to the base members to normal transporting position the latch 39 will be automatically forced by its spring 42 into locking position and the bolt 80 withdrawn from engagement with the socket 79 in the web 78.

The load supporting means, which as illustrated herein is particularly designed for lifting pallets having a central supporting girder, comprises a pair of horizontally spaced load receiving members 89 adapted to enter the pallet and which are rigidly connected at their front ends to an upright framework 90 provided at its lower front ends with a pair of rollers 91 lying within the channels of the standards 4 and engaging the front flanges 92 thereof and at its upper end with a similar pair of rollers 93 engaging the rear inwardly extending flanges 94 of the uprights 4.

Any suitable means for raising and lowering the load supporting means may be employed. As conventionally illustrated herein such means comprises a cable 95 which desirably is secured to the lower portion of the framework 90 of the load supporting means and passes over a sheave 96 mounted substantially centrally of the upper portion of the upright and extends downwardly therefrom and is connected at its lower end to the drum 97 of a winch. The winch is rotated through suitable gearing from a shaft 98 having an angular end portion adapted to receive a suitable actuating crank.

Suitable braking mechanism 99 is provided for controlling the descent of the load and preferably is of the character illustrated in the patent to Nathaniel Warshaw, No. 1,741,215 granted December 31, 1929, the braking mechanism being controlled from a shaft 100 having an angular end portion adapted to be operated by the crank which is used to actuate the winch.

The operation of the mechanism as applied to lifting and transporting loads carried by pallets is graphically illustrated in Figs. 6-10 inclusive which show the various steps in introducing the load supporting means into the pallet, the lifting of the pallet and transporting the same.

Figure 6:
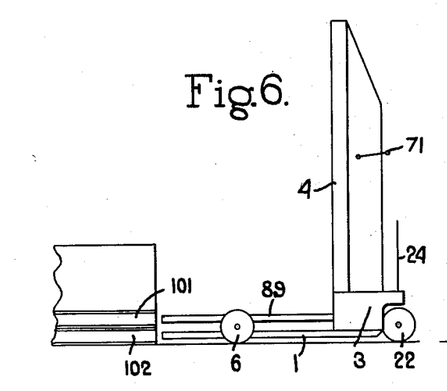
Fig. 6 is a diagrammatic side elevation of a hoisting or stacking machine embodying the invention positioned adjacent to and adapted to be forced rearwardly beneath a pallet to be loaded which is supported at a suitable distance from the floor to enable the base of the truck to be inserted beneath the pallet and the load supporting means to be entered into the pallet.

As illustrated in Fig. 6 the hoisting machine is positioned in front of a pallet 101 which is supported upon another pallet 102, or upon a skid or parallel scantlings sufficient to separate the pallet 101 from the floor enough to enable the base of the truck to be introduced below the pallet 101 to be transported. It will be noted that in this position the manually operable arm 71 is in horizontal position in which the carriage is locked to the base members as in transporting position. In order to introduce the load supporting means into the pallet with the base member inserted beneath the pallet the hoisting machine is pushed backwardly until the wheels 6 engage the front end of the pallet or its support. The manually operable lever 71 is then swung to upright position as illustrated thereby unlatching the carriage from the base members, and simultaneously permitting the ends 83 of the bolts 80 to engage the webs 78 of the rear wheels 6 and either register with or enter the sockets in the webs or upon slight movement of the wheels in either direction to accomplish this purpose.

Figure 8:
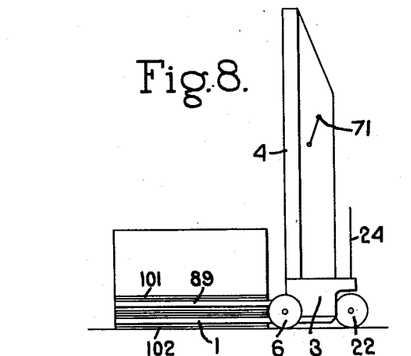
Fig. 8 is a similar view showing the truck and pallet in loading or unloading position after the load supporting means has been fully inserted beneath the pallet.
Figure 9:
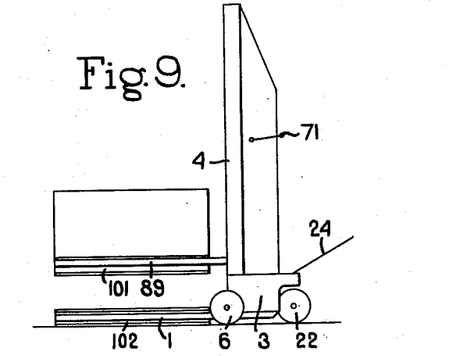
Fig. 9 is a similar view illustrating the load supporting means with the loaded pallet slightly raised preliminarily to transportation; and, Fig. 10 is a similar view showing the loaded truck in position for transportation and the rear wheels located beneath the center of the load supporting means.

The hoisting machine is then pushed backwardly to insert the load supporting means into the pallet, as illustrated in Fig. 8; thereupon the hoisting mechanism is operated to raise the load supporting means and lift the pallet from its support ready for transportation, as illustrated in Fig. 9, at which time the handle lever 71 is swung to horizontal position, thereby moving the actuating lever to the position illustrated in full lines in Fig. 4. The locking bolts 80 for the wheels are still retained in engagement with the sockets in the webs 78 of the wheels. The hoisting machine is then pulled forwardly causing relative movement between the base and the wheels until the latches are sprung into locking engagement with the front walls of the recesses 87. This locking movement of the latch 89 causes the pin 86 at the rear end of the latch to engage the upper end of the slot 85 in the extension of the bolt 80 and simultaneously withdraw the bolt from locking engagement with the webs 78 of the wheels so that the wheels are free to rotate during the transportation of the loaded truck to its destination.

Figure 7:
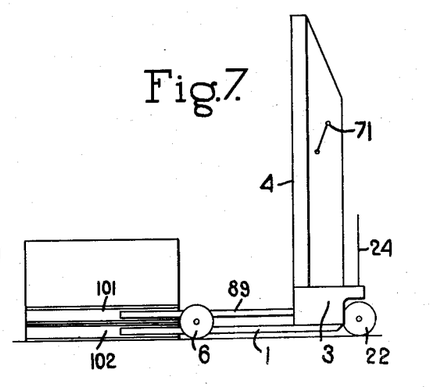
Fig. 7 is a similar diagrammatic view showing the base partially inserted beneath the pallet and the load supporting means entering the pallet, with the rear wheels abutting the front end of the base support and pallet.
Figure 10:
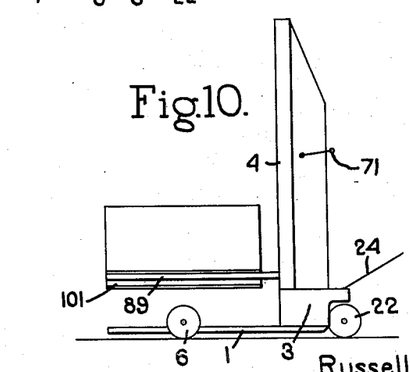

Unloading the truck and stacking of the pallets or skids is performed by reverse operations, the manually operating lever 71 being swung to the position illustrated in Fig. 7 when the rear wheels have engaged the front ends of the supports for the pallets, thereby permitting the load supporting means to be pushed rearwardly while the wheels 6 are locked against rotation. When the load supporting means has been forced inwardly a sufficient distance properly to deposit the pallets upon another support or upon a superimposed pallet, according to the height to which the load supporting means has been lifted, the hoisting mechanism is actuated to deposit the pallet and to release the load receiving members from engagement therewith, whereupon the manually operable lever 71 may be swung to the position illustrated in Fig. 9, the hoisting machine drawn forward thereby causing the rear wheels again to be moved to transporting position, as illustrated in Fig. 10.

It will be noted that the series of rollers 11 at the rear ends of the base members are so mounted that the peripheries thereof which extend below the base members are spaced a short distance from the floor. When the base members of the truck are forced rearwardly into a double face pallet the rollers 11 will ride easily over the lower boards of the pallet and therefore permit the truck to be easily forced rearwardly to loading or unloading position. When the weight of the load has been superimposed upon the load supporting means the rollers 11 ride easily upon the floor boards of the pallet or upon the floor, if the weight of the load tilts the truck rearwardly, so that the truck may be drawn forward easily while the wheels 6 of the carriage remain locked until the carriage is again locked to the base members in load transporting position.

It will thus be obvious that the assemblage is such that pallets, skids, or other loads can be handled by a single operator with a minimum effort upon his part as the only acts required of him to load, transport and unload the hoisting machine or stacker are to push or pull the truck and properly to release the carriage from the wheel to permit relative movement between the rear wheel carriage and base and to preset the locking means at any time after the carriage is moved from normal transporting position.

It will be understood that the particular embodiments of the invention shown and described herein are of an illustrative character and are not restrictive of the meaning and scope of the following claims.

Having thus described the invention, what is claimed as new, and desired to be secured by Letters Patent, is:

1. A portable hoisting machine comprising a head having a rearwardly extending horizontal base rigid therewith, adapted to be introduced beneath the article to be transported, load supporting means having a free end overlying said base, means for raising and lowering said load supporting means, wheel mechanism supporting the front end of said base to permit the steering of the machine, and rear wheel supporting mechanism slidably mounted upon and movable longitudinally of said rigid base to a position adjacent the front end of said load supporting means and to a position at a substantial distance rearwardly thereof and means for preventing rotation of the rear wheels during said relative movements.

2. A portable hoisting machine comprising a head having a rearwardly extending horizontal base rigid therewith, adapted to be introduced beneath the article to be transported, having an upright rigid with the front end of said base, load supporting means slidably mounted on said upright having load receiving means extending rearwardly over said base, means for raising and lowering said load supporting means, wheel mechanism supporting the front end of said base to permit steering of the machine, rear wheel mechanism slidably mounted upon and movable longitudinally of said base to a position adjacent said uprights and to a position remote therefrom beneath said load receiving means, and manually releasable means for locking said rear wheel supporting mechanism to said base when in said remote position.

3. A portable hoisting machine comprising a horizontal base having an upright rigid with the front end of said base, load supporting means mounted on said upright having load receiving means extending rearwardly over said base, means for raising and lowering said load supporting means, wheel mechanism supporting the front end of said base to permit steering of the machine, rear wheel mechanism movable longitudinally relatively to said base to a position adjacent said upright and to a position remote therefrom beneath said load receiving means, and manually controlled releasable locking means normally securing said rear wheel mechanism to said base in said remote position operable when released to permit relative movement of said base and said rear wheel mechanism to shorten the wheel base of the machine, and anti-friction means mounted on the rear portion of said base beyond said remote position and extending a lesser distance below said base than the distance the periphery of said rear wheels project below the base.

4. A portable hoisting machine comprising a horizontal base having an upright rigid with the front end of said base, load supporting means mounted on said upright having load receiving means extending rearwardly over said base, means for raising and lowering said load supporting means, wheel mechanism supporting the front end of said base to permit steering of the machine, rear wheel mechanism movable longitudinally relatively to said base to a position adjacent said uprights and to a position remote therefrom beneath said load receiving means, manually controlled releasable locking means normally securing said rear wheel mechanism to said base in said remote position, operable when released to permit relative movement of said base and said rear wheel mechanism to shorten the wheel base of the machine, and means for restricting rotation of said rear wheels during the relative movement of said base and rear wheel mechanism.

5. A portable hoisting machine comprising a horizontal base having an upright rigid with the front end of said base, load supporting means mounted on said upright having load receiving means extending rearwardly over said base, means for raising and lowering said load supporting means, wheel mechanism supporting the front end of said base to permit steering of the machine, rear wheel mechanism movable longitudinally relatively to said base to a position adjacent said upright and to a position remote therefrom beneath said load receiving means, manually controlled releasable locking means normally securing said rear wheel mechanism to said base in said remote position operable when released to pemit relative movement of said base and said rear wheel mechanism to shorten the wheel base of the machine, and means automatically operable by said lock-releasing mechanism to prevent rotation of said rear wheels while the rear wheel mechanism is released from said base and during relative movement between said base and said rear wheel mechanism.

6. A portable hoisting machine comprising a head and a rearwardly extending horizontal base rigid therewith heaving floor-engaging rollers at the rear end portion thereof, an upright rigid with the front end of said base, load supporting means mounted on said upright having rear- wardly extending load receiving means overlying said base, means for raising and lowering said load supporting means, steering wheel mechanism supporting the front end of said base, rear wheel supporting mechanism mounted on and slidably movable longitudinally of said base to a position adjacent said upright and to a position remote therefrom beneath said load receiving means operable when moved rearwardly to raise the rear end of said base and separate the rollers thereon from engagement with the floor.

7. A portable hoisting machine comprising a head having a rearwardly extending horizontal base rigid therewith, an upright rigid with the front end of said base, load supporting means mounted on said upright having rearwardly extending load receiving means overlying said base, means for raising and lowering said load supporting means, steering wheel mechanism supporting the front end of said base, a carriage slidably mounted on said base having floor-engaging wheels, releasable locking means normally connecting said carriage to said base at a predetermined distance from the front end thereof and beneath said load receiving means, and manually operable lock-releasing means for permitting said carriage to move forwardly into proximity to said upright for loading and unloading said load receiving means.

8. A portable hoisting machine comprising a base, an upright rigid with the front end of said base, load supporting means mounted on said upright having rearwardly extending load receiving means, means for raising and lowering said load supporting means, steering wheel mechanism supporting the front end of said frame, a carriage slidably mounted on said base having floor-engaging wheels, releasable locking means normally connecting said carriage to said base at a predetermined distance from the front end thereof and beneath said load receiving means, manually operable lock-releasing means for permitting said carriage to move forwardly, and means operable in conjunction with said lock-receiving means to prevent rotation of the wheels of said carriage while the carriage is unlocked from said base, thereby to permit the base to be moved rearwardly and forwardly relatively to said non-rotating wheels.

9. A portable hoisting machine comprising a base, an upright rigid with the front end of said base, load supporting means mounted on said upright having rearwardly extending load receiving means, means for raising and lowering said load supporting means, steering wheel mechanism supporting the front end of said frame, a carriage slidably mounted on said base having floor-engaging wheels, releasable locking means normally connecting said carriage to said base at a predetermined distance from the front end thereof and beneath said load receiving means, manually operable lock-releasing means for permitting said carriage to move forwardly, means automatically operable by said lock-releasing means to prevent rotation of said carriage wheels during relative movement between said base and said carriage and operable upon locking of said carriage to said base to permit rotation of said carriage wheels, and means for selectively retaining said locking means in locking or in unlocked position.

10. A portable stacking machine for a pallet supported at a distance from the floor comprising a frame having horizontal spaced base members rigidly connected together at their front ends, an upright rigid with the front end of said base members, load supporting means mounted on said upright having spaced horizontal rearwardly extending load receiving means, means for raising and lowering said load supporting means, steering wheel mechanism supporting the front end of said frame, a carriage having floor-engaging wheels mounted on and relatively movable longitudinally of said base members to a position adjacent said upright and to a predetermined position from said upright beneath said load receiving means, releasable means normally locking the carriage to the base member at said predetermined distance from said upright, manually operable means for releasing said locking means to permit said base member to be thrust beneath the pallet to be raised and to permit the load receiving means when properly positioned to be inserted into the pallet and the pallet raised from the support, and means for preventing rotation of the carriage wheels during the relative movements of said base members and said carriage.

11. A portable hoisting machine comprising a head having a rearwardly extending horizontal base rigid therewith, an upright rigid with the front end of said base, load supporting means slidably mounted on said upright having rearwardly extending load receiving means overlying said base, means for raising and lowering said load supporting means, steering wheel mechanism supporting the front end of said base, means for supporting the rear portion of said base comprising a carriage having floor-engaging wheels slidably mounted on said base for relative longitudinal movements therebetween, anti-friction means intermediate of said carriage and said base for reducing friction between said carriage and said base during said relative longitudinal movements and means for preventing rotation of the wheels of said carriage during said relative longitudinal movements.

12. A portable hoisting machine comprising a head having a rearwardly extending horizontal base rigid therewith, an upright rigid with the front end of said base, load supporting means mounted on said upright having rearwardly extending load receiving means overlying said base, means for raising and lowering said load supporting means, steering wheel mechanism supporting the front end of said base, a carriage having floor-engaging wheels slidably mounted on said base for relative longitudinal movements therebetween, anti-friction means supporting said carriage on said base, and anti-friction means mounted on said carriage laterally engaging said base operable to prevent skewing of said carriage during said relative longitudinal movements.

13. A portable hoisting machine comprising a head having a rearwardly extending horizontal base rigid therewith, an upright rigid with the front end of said base, load supporting means mounted on said upright having rearwardly extending load receiving means overlying said base, means for raising and lowering said load supporting means, steering wheel mechanism supporting the front end of said base, a carriage having floor-engaging wheels slidably mounted on said base for relative longitudinal movements therebetween, latching means on said carriage, cooperating locking means on said base located at a predetermined distance rearwardly of said upright adapted to be engaged by said latching means, and means for releasing said latching means from said cooperating locking means.

14. A portable hoisting machine comprising a head having a rearwardly extending horizontal base rigid therewith, an upright rigid with the front end of said base, load supporting means mounted on said upright having rearwardly extending load receiving means overlying said base, means for raising and lowering said load supporting means, steering wheel mechanism supporting the front end of said base, a carriage having floor-engaging wheels slidably mounted on said base for relative longitudinal movements therebetween, latching means on said carriage, cooperating locking means on said base located at a predetermined distance rearwardly of said upright adapted to be engaged by said latching means, means for releasing said latching means from said cooperating locking means, and means operable by said latching means when released from locking position to prevent rotation of said carriage wheels during relative movement between said carriage and said base.

15. A portable stacking machine for a pallet supported at a distance from the floor comprising a frame having horizontal spaced base members rigidly connected together at their front ends, an upright rigid with the front end of said base members, load supporting means mounted on said standard having spaced horizontal rearwardly extending load receiving means, means for raising and lowering said load supporting means, steering wheel mechanism supporting the front end of said frame, a carriage slidably mounted on said base members having floor-engaging wheels, latches pivotally mounted on said carriage, cooperating locking shoulders on said base members located at a predetermined distance rearwardly of said upright adapted to be engaged by said latches, resilient means acting upon said latches normally to hold them in engagement with said cooperating locking shoulders, latch-releasing levers mounted on said base members in proximity to said locking shoulders, and manually operable means for actuating said latching levers to permit relative movement of said carriage and said base members.

16. A portable stacking machine for a pallet supported at a distance from the floor comprising a frame having horizontal spaced base members rigidly connected together at their front ends, an upright rigid with the front end of said base members, load supporting means mounted on said standard having spaced horizontal rearwardly extending load receiving means, means for raising and lowering said load supporting means, steering wheel mechanism supporting the front end of said frame, a carriage slidably mounted on said base members having floor engaging wheels provided with an axially circular series of sockets, latches pivotally mounted on said carriage, cooperating locking shoulders on said base members located at a predetermined distance rearwardly of said upright adapted to be engaged by said latches, resilient means acting upon said latches normally to hold them in engagement with said cooperating locking shoulders, latch-releasing levers mounted on said base members in proximity to said locking shoulders, manually operable means for actuating said latching levers to permit relative movement of said carriage and said base members, locking bolts slidably mounted in said carriage pivotally connected to said latches operable when the latches are unlocked to engage sockets in said wheels, and means on said latches adapted to engage said base members during the relative movements of said carriage and said base members and to prevent disengagement of said locking bolts during the relative movements of said base and carriage.

17. A portable stacking machine for a pallet supported at a distance from the floor comprising a frame having horizontal spaced base members rigidly connected together at their front ends, an upright rigid with the front end of said base members, load supporting means mounted on said standard having spaced horizontal rearwardly extending load receiving means, means for raising and lowering said load supporting means, steering wheel mechanism supporting the front end of said frame, a carriage slidably mounted on said base members having floor-engaging wheels, latches pivotally mounted on said carriage, cooperating locking shoulders on said base members located at a predetermined distance rearwardly of said upright adapted to be engaged by said latches, resilient means acting upon said latches normally to hold them in engagement with said cooperating locking shoulders, latch-releasing levers mounted on said carriage in proximity to said locking shoulders, manually operable means for actuating said latching levers to permit relative movement of said carriage and said base members, locking bolts slidably mounted in said carriage pivotally and slidably connected to said latches adapted to engage the slots in said wheels, resilient means of less strength than the resilient means tending to force the latches into locking position tending normally to force said bolts to socket-engaging position and operable upon release of said latches to force said bolts into such engagement, and means upon said latches engaging said base members acting to prevent retraction of said bolts during the relative movement between the carriage and the base members.

18. A portable stacking machine for a pallet supported at a distance from the floor comprising a frame having horizontal spaced base members rigidly connected together at their front ends, load supporting means having spaced horizontal rearwardly extending load receiving means adapted to enter the pallet to be lifted, means for raising and lowering said load supporting means, a carriage slidably mounted on said base member having floor-engaging wheels and movable toward and from the front end of the load supporting means, means for releasably locking the carriage to the base members at a predetermined distance from said front end and beneath the load supporting means, means for preventing rotation of the carriage wheels during such relative movement, and a series of rollers mounted upon the rear end portions of said base members adapted to facilitate introduction of the base members into a supporting pallet or beneath the load to be raised and to facilitate relative movement between the carriage and base members when the base members are withdrawn from loading or unloading position while rotation of the carriage wheels is prevented.

19. A hoisting machine or stacker of the character described comprising a head having rearwardly extending horizontal members rigid therewith adapted to be inserted beneath a pallet or skid to be lifted and transported, load supporting means having rearwardly extending load receiving members overlying said base members adapted to be entered into the pallet or beneath the skid to be lifted, a carriage slidably movable on said base members, releasable means for locking the carriage midway of the length of said base members for transportation, means operable thereby upon release of said carriage lock to prevent rotation of the wheels while the carriage is unlocked from the base, a manually operable lock-actuating lever, and means automatically operable to retain said lever selectively in lock-releasing position or in the position to permit relocking of the carriage to the base members when the carriage is moved to transporting position.

RUSSELL HASTINGS, Jr.